United States Patent [19]
Rohde

[11] 3,762,093
[45] Oct. 2, 1973

[54] DISPOSABLE MOUSETRAP

[76] Inventor: William E. Rohde, 2849 Invergarry Rd., Memphis, Tenn.

[22] Filed: May 8, 1972

[21] Appl. No.: 251,011

[52] U.S. Cl. .................................... 43/83.5, 43/61
[51] Int. Cl. ............................................. A01m 23/20
[58] Field of Search .................... 43/83.5, 74, 61, 43/81

[56] References Cited
UNITED STATES PATENTS

| 2,408,740 | 10/1946 | De Asis | 43/61 |
| 1,650,455 | 11/1927 | Lewis | 43/61 |
| 1,861,478 | 6/1932 | Kleffman | 43/61 |
| 3,426,470 | 2/1969 | Rudolph | 43/61 |

FOREIGN PATENTS OR APPLICATIONS

| 649,807 | 1/1951 | Great Britain | 43/61 |

*Primary Examiner*—Louis G. Mancene
*Assistant Examiner*—James H. Czerwonky
*Attorney*—John R. Walker, III

[57] ABSTRACT

A mousetrap including a boxlike body having an opening therein which is selectively closed by a door. Mouse constraining structure is included for holding the mouse firmly against the bottom side of the boxlike body. The mouse constraining structure is pivotally attached to the door and closing the door is effective to move the mouse constraining structure to a constrained position, and opening the door is effective to move the mouse constraining structure upward to a released position. A spring is included for urging the door closed and a triggering device is provided which has a cocked position and a tripped position. Opening the door is effective to move the triggering device to the cocked position wherein the door is held open and subsequent movement of the triggering device to the tripped position is effective to release the door, thereby allowing it to snap closed. The mouse is constrained against the bottom side of the boxlike body and in the event he is able to free himself therefrom, he is still captured within the enclosed boxlike body. One embodiment of the constraining structure is intended to deliver a lethal blow to the mouse as the door snaps closed.

3 Claims, 5 Drawing Figures

PATENTED OCT 2 1973 3,762,093
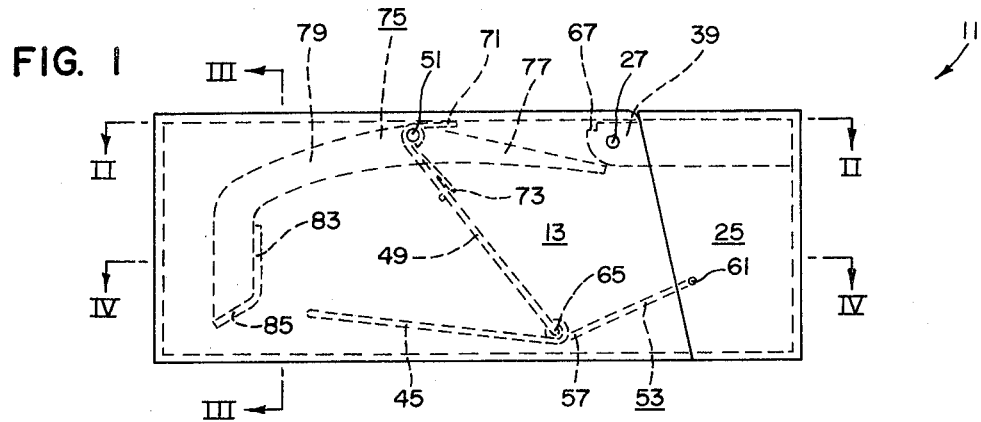
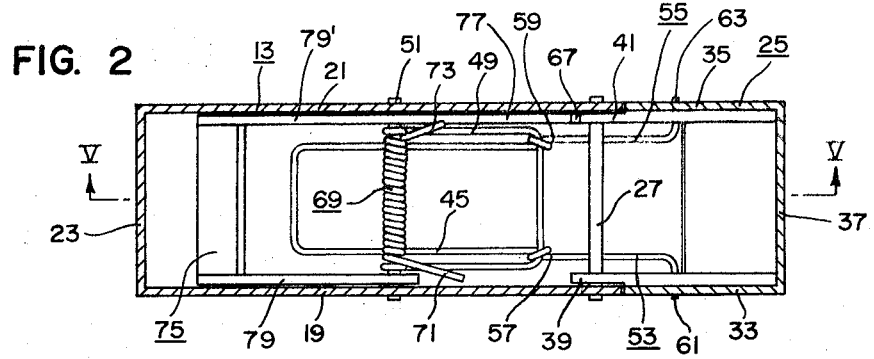
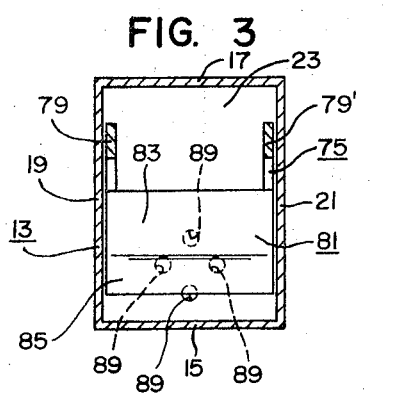
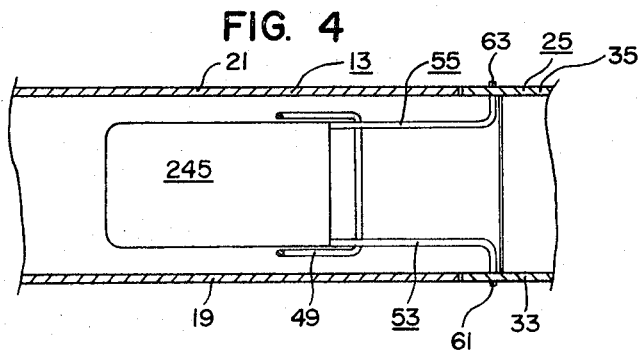
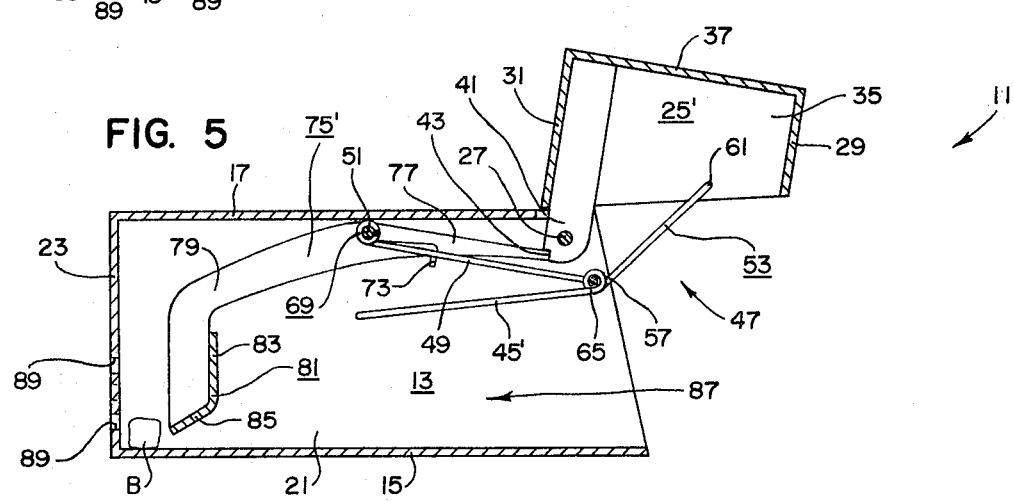

DISPOSABLE MOUSETRAP

BACKGROUND OF THE INVENTION

1. Field of the Invention

This invention relates to mousetraps and is particularly directed toward traps of the box type.

2. Description of the Prior Art

The usual practice in box-type or cage traps is to provide a box with a trip action door for caging the mouse, i.e., the mouse being free to run about the interior of the trap. Traps of the above-disclosed type have certain disadvantages: First, since the trap is intended to be used repeatedly, a problem is encountered in disposing of the mouse. In other words, while opening the door to retrieve the mouse, the likelihood of his escaping is exceedingly great. Secondly, assuming that the mouse is retrieved, the problem of exterminating the live mouse still prevails. In other words, picture if you will the trapper standing with a live mouse in his hand and being confronted with the problem of exterminating the mouse. Most persons would consider this task completely intolerable, particularly when the trapper happens to be a housewife. Third, most housewives can't even endure the sight of a mouse whether caged or uncaged, be it dead or alive.

A preliminary patentability search revealed the following U.S. patents: Carpenter U.S. Pat. No. 610,755; Tremble U.S. Pat. No. 1,261,189; Kleffman U.S. Pat. No. 1,861,478; and Wood et al. Pat. No. 3,394,487. None of the above patents show or suggest applicant's device.

SUMMARY OF THE INVENTION

The present invention is directed towards overcoming the problems and disadvantages relative to previous box-type traps. The concept of the present inventirn is to provide a simple inexpensive throw-away type mousetrap, i.e., when the mouse is caught therein, the trap is simply discarded with other disposable trash. Further, the boxlike structure is opaque so as to prevent viewing the captured mouse. In fact, the mousetrap of the present invention preferably is provided with a decorative exterior so as not to present an unsightly appearance to the household.

The disposable mousetrap of the present invention includes a boxlike body having one of the ends thereof closed and the opposite end being open. A door is provided which is pivotally attached to the body, having open and closed positions for selectively closing the open end of the body. Mouse constraining structure is included for holding the mouse firmly against the bottom side of the boxlike body. The mouse constraining structure in one embodiment comprises paddlelike structure for simply constraining the live mouse and in another embodiment comprises wirelike structure for delivering a lethal blow to the body of the mouse. In either event, the mouse constraining structure is pivotally attached to the door and closing the door is effective to move the mouse constraining structure to a constrained position and opening the door is effective to move the mouse constraining structure upward to a released position. A spring is included for urging the door closed and triggering device is provided which has a cocked position and a tripped position. Opening the door is effective to move the triggering device to the cocked position wherein the door is held open and subsequent movement of the triggering device to the tripped position is effective to release the door, thereby allow it to snap closed. The mousetrap of the present invention is double-acting or in effect, is two traps in one. In other words, the mouse is constrained against the bottom side of the boxlike body and in the event he is able to free himself therefrom, he is still captured within the enclosed boxlike body.

BRIEF DESCRIPTION OF THE DRAWINGS

FIG. 1 is a side elevational view of the disposable mousetrap of the present invention shown in a tripped or a closed position.

FIG. 2 is a sectional view taken as on the line II—II of FIG. 1.

FIG. 3 is a sectional view taken as on the line III—III of FIG. 1.

FIG. 4 is a partial sectional view taken as on the line IV—IV of FIG. 1 showing an alternate embodiment of certain structure thereof.

FIG. 5 is a sectional view taken as on the line V—V of FIG. 2 showing the mousetrap in a cocked position.

DESCRIPTION OF THE PREFERRED EMBODIMENT

The mousetrap 11 of the present invention includes a tubular or rectangular member 13 having a floor portion 15 and a top portion 17 joined by a pair of vertical wall portions 19, 21. The member 13 has an end wall portion 23 closing one of the ends thereof with the opposite end being open. A door 25 is included which is pivotally attached to the member 13, or more specifically, to the vertical wall portions 19, 21 by a pivot pin 27. The member 13, the end wall portion 23, and the door 25 preferably are formed from plastic or the like. Additionally, the pivot pin 27 may optionally comprise a pair of pivot pins which may integrally be formed with the door 25 in a manner obvious to those skilled in the art.

The door 25 has a closed position, as depicted in FIG. 1 of the drawings, and an open position, as depicted in FIG. 5 of the drawings and character referenced therein by the numeral 25'. The door 25 includes a floor portion 29, a top portion 31 joined by vertical side portions 33, 35 and an end portion 37.

The mousetrap 11 includes a pair of lugs 39, 41 fixedly attached to the door 25 and projecting into the open end of the member 13 adjacent the upper side of the top portion 17 thereof. The respective lugs 39, 41 are attached to the interior surfaces of the vertical portions 33, 35 and are provided with suitable apertures for receiving the pivot pin 27. In other words, the lugs 39, 41, being attached to the door 25, enable the door 25 to pivot about a horizontal axis between the previously described closed and open positions. It should be understood that the top portion 17 preferably has portions adjacent the lugs 39, 41 cut away (not shown) to receive the lugs 39, 41 and thus facilitate moving the door 25' to the position depicted in FIG. 5.

The mousetrap 11 includes mouse constraining means 45 having a constrained position, as depicted in FIG. 1 of the drawings, and a released position, as depicted in FIG. 5 of the drawings and character referenced therein by the numeral 45'. The mouse constraining means 45 is positioned within the member 13 with one of the ends thereof terminating adjacent the closed end of end wall portion 23 of the member 13, as clearly shown in the drawings. The mouse constraining means 45 includes coupling means 47 for moving the mouse constraining means 45 to the constrained position in response to closing of the door 25 and for carrying the mouse constraining means 45 upward to the released position 45' in response to opening of the door 25. The mouse constraining means 45 preferably is formed from stiff steel wire or the like, as shown in FIG. 1 and 2 of the drawings, for delivering a lethal blow to the body of the mouse. The coupling means 47 includes a swing member 49 swingably attached to the vertical wall portions 19, 21 by a pivot pin 51 and a pair of arm members 53, 55. The arm members 53, 55 have one of their respective ends 57, 59 fixedly attached to the mouse constraining means 45 and the other ends thereof are pivotally attached to the vertical portions 33, 35 by a pair of pivot pins 61, 63. The arm members 53, 55 are preferably integrally attached to constraining means 45, that is, being formed of the same piece of wire loosely wound around a portion of swing member 49. From FIGS. 1 and 5 of the drawings, it may be seen that the mouse constraining means 45 is pivotally attached to the swing member 49 as at pivot point 65. Therefore, moving the door 25 from the closed position to the open position 25' causes the lugs 39, 41 to pivot about the pivot pin 27, the swing member 49 to pivot about the pivot pin 51, the respective arm members 53, 55 to pivot about the pivot pins 61, 63, and the mouse constraining means 45 to pivot about the pivot point 65.

At least one of the lugs, e.g., the lug 41, is provided with a detent 67 for reasons yet to be disclosed. The mousetrap 11 includes a spring means 69 for urging the door 25 towards the previously described closed position. The spring means 69 preferably is convolutely received about the pivot pin 51 having one of its ends 71 resting against the top portion 17 of the member 13 and the other end 73 thereof suitably engaging the swing member 49 so as to urge the lower end of the swing member 49 toward the floor 15 or to urge clockwise rotation of the swing member 49 about the pivot pin 51, as viewed in FIG. 1 of the drawings.

The mousetrap 11 includes trigger means 75 which is pivotally attached to the pivot pin 51. The trigger means 75 is movable to a cocked position as depicted in FIG. 5 of the drawings and character referenced by the numeral 75' in response to movement of the door 25 to the open position 25' and wherein a first portion 77 of the trigger means engages the detent 67 for holding the door 25 in the open position and for releasing the door 25 in response to movement of the trigger means 75 to a tripped position, as depicted in FIG. 1 of the drawings, and wherein the first portion 77 of the trigger means 75 moves away from the detent 67 for releasing the door 25.

The trigger means 75 includes a second portion 79 which is positioned adjacent the closed end or end wall portion 23 of the member 13. It should be mentioned that the mousetrap 11 preferably is baited by placing bait B between the end wall portion 23 and the second portion 79 to increase the probability of the mouse engaging the second portion 79 in his endeavor to gain access to the bait B. The second portion 79 depends from the first portion 77 and extends downwardly so as to be adjacent the bottom side or floor 15 of the member 13.

The second portion 79 includes barrier means 81 for denying access of the bait B to the mouse. It should be understood that the first portion 77 may be a single member engaging a single lug, or it may be a pair of identical members engaging identical detents in the pair of lugs 39, 41. However, regardless of the configuration of the first portion 77, the second portion 79 will preferably include a pair of spaced apart members 79, 79'. Additionally, the barrier means 81 preferably includes an upper member 83 and a lower member 85. The members 83, 85 join the lower ends of the second portions 79, 79' as clearly shown in FIGS. 3 and 5 of the drawings. The barrier means 81 and the constraining means 45 define in part a channel 87 for accommodating the mouse or providing a passageway for directing the mouse toward the bait B. The lower member 85 of the barrier means 81 tapers downwardly at the terminus of the channel 87 to force the mouse to engage his nose therewith in his eagerness to gain access to the bait B.

From FIGS. 3 and 5 of the drawings, it may be seen that the end wall portion 23 is provided with a plurality of apertures 89 to allow free passage of the aroma of the bait B, thus attracting the mouse to the trap 11. Obviously, when the mouse approaches the end wall portion 23 and realizes that he cannot gain access to the bait B through the apertures 89, he will circle around to the opposite end of the trap 11 and enter through the open end of the member 13 and meander along the channel 87 until he engages the trigger means 75, or more specifically, the barrier means 81 thereof. The slightest movement of the barrier means 81 displaces the first portion 77 from the detent 67, thus allowing the spring means 69 to carry the swing member 49 downwardly which returns the constraining means 45 to the constrained position, as shown in FIG. 1, thus delivering a lethal blow to the body of the mouse, and the coupling means 47 closes the door 25. In order to minimize the excitement or frustration of the housewife, the tubular member 13 and the door 25 preferably are opaque, thus preventing viewing the captured mouse. In fact, the exterior of the mousetrap 11 may optionally be decorated with psychedelic colors or flowers or the like.

It should be mentioned that the trigger means 75 preferably is formed from plastic or the like. The second portion 76 is slightly heavier than the first portion 77, thus the gravitational pull on the second portion 79 tends to cause counterclockwise rotation of the trigger means 75 as viewed in FIG. 1. In this manner, the trigger means automaticadly moves to the previously described cocked position by simply opening the door to the position shown in FIG. 5 and character referenced by the numeral 25'.

An alternate embodiment of the mouse constraining means is depicted in FIG. 4 of the drawings and character referenced therein by the numeral 245. The constraining means 245 includes broad paddlelike structure for preventing the live mouse from moving about within the tubular member 13 after the door 25 closes. In other words, it is not the intention of the constraining means 245 to necessarily deliver a lethal blow to the mouse, but rather to constrain the mouse after the trigger means 75 has caused the door 25 to close, thus minimizing the excitement and frustration of the housewife while she picks up the trap 11 and carries it to her trash container. The mousetrap 11 is very inexpensively constructed. Therefore, it is anticipated that most housewives would prefer to dispose of the mousetrap 11 rather than attempt to empty it for further utilization.

Although the invention has been described and illustrated with respect to preferred embodiments thereof, it is not to be so limited since changes and modifications may be made therein which are within the full intended scope of the invention.

I claim:

1. A disposable mousetrap comprising elongated tubular means having one of the ends thereof open and the opposite end being closed, a door for closing said open end, a pair of lugs fixedly attached to said door and projecting into the open end of said tubular means adjacent the upper side thereof, one of said lugs being provided with a detent, pivot means for pivotally attaching said lug means to said tubular means enabling said door to pivot about a horizontal axis between a closed position and an open position, mouse constraining means for holding the mouse firmly against the bottom side of said tubular means, said mouse constraining means having a constrained position and a released position and being disposed within said tubular means having one of the ends thereof terminating adjacent said closed end of said tubular means, means coupled to said constraining means and to said door for moving said mouse constraining means to said constrained position in response to closing of said door and for carrying said mouse constraining means upward to said released position in response to opening of said door, spring means for urging said door towards said closed position, and trigger means pivotally attached to said tubular means and movable to a cocked position in response to movement of said door to said open position wherein a first portion of said trigger means engages said detent for holding said door in said open position and for releasing said door in response to movement of said trigger means to a tripped position wherein said first portion of said trigger means moves away from said detent for releasing said door.

2. The mousetrap of claim 4 in which said trigger means includes a second portion disposed adjacent said closed end, said trap being baited by placing bait between said closed end and said second portion of said trigger means, said second portion depending from said first portion and extending downwardly adjacent the bottom side of said tubular means, said second portion including barrier means for denying access of the bait to the mouse, said barrier means and said constraining means defining in part a channel for accommodating the mouse, said barrier means tapering downwardly at the terminus of said channel to force the mouse to engage his nose therewith in his eagerness to gain access to the bait.

3. The mousetrap of claim 4 in which said tubular means and said door are opaque to prevent viewing the captured mouse.

* * * * *